United States Patent
Sakayanagi

(10) Patent No.: US 9,303,569 B2
(45) Date of Patent: Apr. 5, 2016

(54) CONTROL DEVICE FOR INTERNAL COMBUSTION ENGINE

(75) Inventor: Yoshihiro Sakayanagi, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/413,830

(22) PCT Filed: Jul. 19, 2012

(86) PCT No.: PCT/JP2012/068360
§ 371 (c)(1),
(2), (4) Date: Jan. 9, 2015

(87) PCT Pub. No.: WO2014/013590
PCT Pub. Date: Jan. 23, 2014

(65) Prior Publication Data
US 2015/0136092 A1 May 21, 2015

(51) Int. Cl.
*F01L 1/34* (2006.01)
*F02D 13/02* (2006.01)
(Continued)

(52) U.S. Cl.
CPC ........ *F02D 13/0234* (2013.01); *F02D 13/0219* (2013.01); *F02D 13/0261* (2013.01); *F02D 23/00* (2013.01); *F02D 41/0002* (2013.01);
(Continued)

(58) Field of Classification Search
CPC . F02D 13/0234; F02D 23/00; F02D 41/0002; F02D 13/0219; F02D 13/0261; F02D 2041/001; F02D 2200/0402; Y02T 10/144; Y02T 10/42; Y02T 10/18
USPC ..................................................... 123/90.17
See application file for complete search history.

(56) References Cited

U.S. PATENT DOCUMENTS

| | | | |
|---|---|---|---|
| 7,848,873 B2 * | 12/2010 | Fuwa | F01L 13/00 123/347 |
| 2004/0182346 A1 | 9/2004 | Eiraku | |
| 2006/0037569 A1 | 2/2006 | Minami et al. | |

FOREIGN PATENT DOCUMENTS

| | | |
|---|---|---|
| EP | 1 857 894 A1 | 11/2007 |
| JP | 2000-87769 | 3/2000 |
| JP | 2004-245082 | 9/2004 |
| JP | 2006-57573 | 3/2006 |

(Continued)

*Primary Examiner* — Zelalem Eshete
(74) *Attorney, Agent, or Firm* — Finnegan, Henderson, Farabow, Garrett & Dunner, LLP

(57) ABSTRACT

An object of this invention is to appropriately control the valve timing (VT) even in a case where a plurality of local maximum points or local minimum points exist on a characteristic line representing a relation between the VT and an air amount. An engine 10 includes VVTs 42 and 44 and the like. When a predetermined operation condition that a plurality of local maximum points exist on a load characteristic line representing a relation between the VT of an intake valve 32 and a load KL is established, an ECU 60 first calculates the VT corresponding to a maximum value KLmax of the load KL as a maximum air amount VT (VTmax). Subsequently, if the maximum value KLmax of the load is less than a target KL, the ECU 60 changes the VT towards VTmax. Thus, the direction in which the VT is changed is determined based on VTmax that is calculated irrespective of a change tendency (slope) of the characteristic line or the like at the current time. Therefore, even when a plurality of local maximum points exist on a characteristic line of an air amount index, it is possible to prevent the VT from being guided by the slope of a characteristic line or the like and latching onto a local maximum point that is not the optimal point.

7 Claims, 11 Drawing Sheets

(51) Int. Cl.
  *F02D 23/00* (2006.01)
  *F02D 41/00* (2006.01)
(52) U.S. Cl.
  CPC ... *F02D 2041/001* (2013.01); *F02D 2200/0402* (2013.01); *Y02T 10/144* (2013.01); *Y02T 10/18* (2013.01); *Y02T 10/42* (2013.01)

(56) References Cited

FOREIGN PATENT DOCUMENTS

| JP | 2007-198284 | 8/2007 |
| JP | 2009-57945 | 3/2009 |

* cited by examiner

Fig. 2
(A) A CASE WHERE ONLY ONE LOCAL MAXIMUM POINT EXISTS
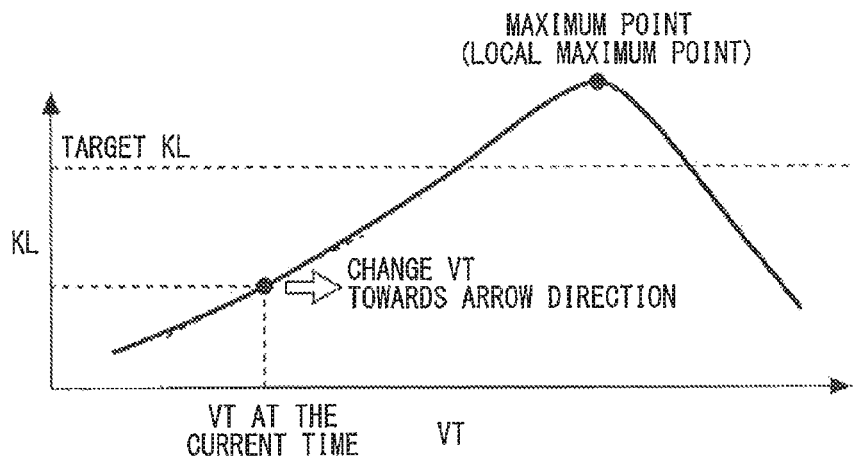
(B) A CASE WHERE TWO LOCAL MAXIMUM POINTS EXIST
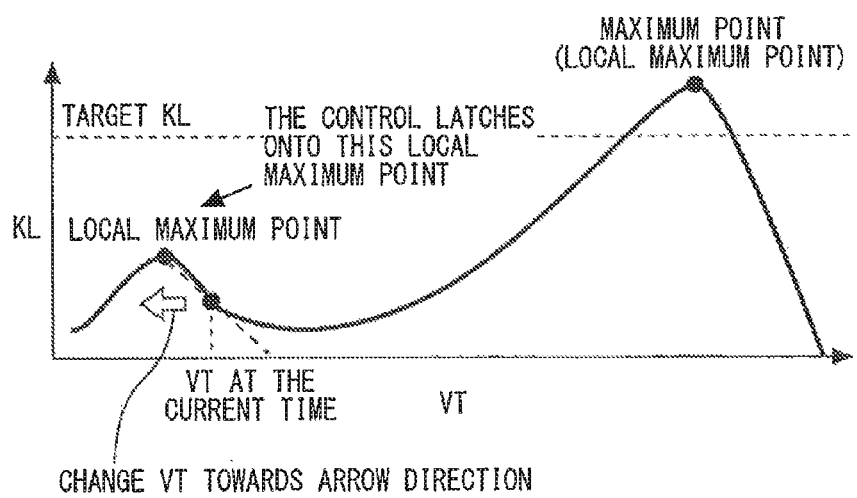

CONTROL DEVICE FOR INTERNAL COMBUSTION ENGINE

CROSS-REFERENCE TO RELATED APPLICATIONS

This application is a national phase application of International Application No. PCT/JP2012/068360, filed Jul. 19, 2012, the content of which is incorporated herein by reference.

TECHNICAL FIELD

The present invention relates to a control device for an internal combustion engine that includes a valve timing varying mechanism, that is favorably used, for example, as an automobile engine.

BACKGROUND ART

A control device for an internal combustion engine that includes a VVT (variable valve timing system) is already known, as disclosed, for example, in Patent Literature 1 (Japanese Patent Laid-Open No. 2004-245082). In the conventional technology a configuration is adopted that appropriately controls an air amount to be drawn into a cylinder by setting a target valve opening characteristic and a target intake air pressure in a range that is realizable within a predetermined time period, and driving the VVT so as to realize these target values.

The applicants are aware of the following literature, which includes the above described literature, as literature related to the present invention.

CITATION LIST

Patent Literature

Patent Literature 1: Japanese Patent Laid-Open No. 2004-245082
Patent Literature 2: Japanese Patent Laid-Open No. 2009-057945
Patent Literature 3: Japanese Patent Laid-Open No. 2006-057573
Patent Literature 4: Japanese Patent Laid-Open No. 2000-87769

SUMMARY OF INVENTION

Technical Problem

According to the above described conventional technology, an actual air amount that is drawn into a cylinder can be made to match a target value by appropriately controlling the valve timing of an intake valve by means of VVT control. As a specific example, in the VVT control, in a case where the current air amount is less than the target value, control is performed that searches for a valve timing at which the air amount matches the target value by changing the valve timing in a direction in which the air amount increases from the current value. Further, in a case where the current air amount is greater than the target value, the aforementioned search is executed by changing the valve timing in a direction in which the air amount decreases.

However, in some cases a plurality of local maximum points exist on an air amount characteristic line that represents the relation between the valve timing and the air amount. A transition period that extends from before the occurrence of scavenging until after the occurrence thereof in an engine with a supercharger may be mentioned as one example of such a case. If there are a plurality of local maximum points on an air amount characteristic line, in some cases it is not possible to determine the correct direction in which the valve timing should be changed on the basis of a change characteristic (slope of an air amount characteristic line) of the air amount with respect to the current valve timing. That is, for example, in a case where the air amount is less than the target value, even if the valve timing is changed towards one local maximum point at which the air amount is locally maximized, there is the possibility that a local maximum point at which the air amount arrives at the target value exists in the opposite direction thereto.

Therefore, in the conventional technology there is the problem that when a plurality of local maximum points exist on an air amount characteristic line, in some cases the valve timing is changed in the wrong direction, and as a result a deterioration in the response or a sudden change in the air amount arises. This problem also occurs when a plurality of local minimum points exist on an air amount characteristic line.

The present invention has been conceived to solve the above described problems, and an object of the present invention is to provide a control device for an internal combustion engine that is capable of appropriately controlling the valve timing and improving drivability even in a case where a plurality of local maximum points or local minimum points exist on a characteristic line representing the relation between the valve timing and the air amount.

Means for Solving the Problem

A first aspect of the present invention is a control device for internal combustion engine, comprising:
valve timing varying means that is capable of changing a valve timing of an intake valve, and
intake valve control means for setting a target value of an air amount index in which an air amount in a cylinder is reflected, and also calculating a target valve timing that is a target value of the valve timing of the intake valve based on the target value of the air amount index, and controlling the valve timing of the intake valve so that the valve timing matches the target valve timing by driving the valve timing varying means;
wherein the intake valve control means comprises:
maximum air amount VT calculation means for, in a case where a predetermined operation condition that a plurality of local maximum points exist on a characteristic line representing a relation between the valve timing of the intake valve and the air amount index is established, calculating a valve timing corresponding to a maximum value of the air amount index as a maximum air amount VT, and
air amount maximizing means for, in a case where the operation condition is established and the maximum value of the air amount index is less than the target value, changing the valve timing of the intake valve towards the maximum air amount VT.

A second aspect of the present invention, wherein:
the intake valve control means comprises air amount increasing means for, in a case where the maximum value of the air amount index is greater than the target value and the target value is greater than a current air amount index in a state in which the operation condition is established, changing the valve timing of the intake valve towards the maximum air amount VT until reaching a value that corresponds to the target value.

A third aspect of the present invention, wherein:

the intake valve control means comprises air amount decreasing means for, in a case where the maximum value of the air amount index is greater than the target value and the target value is less than a current air amount index in a state in which the operation condition is established, changing the valve timing of the intake valve in a direction in which the air amount index decreases, until reaching a value that corresponds to the target value.

A fourth aspect of the present invention, wherein:

the intake valve control means comprises vicinity searching means for, in a case where the operation condition is established and a difference between a current air amount index and the target value is less than a predetermined vicinity determination value, changing the valve timing of the intake valve in a direction in which the difference decreases.

A fifth aspect of the present invention, further comprising:

minimum air amount VT calculation means for, in a case where a predetermined operation condition that a plurality of local minimum points exist on the characteristic line is established, calculating a valve timing corresponding to a minimum value of the air amount index among the respective local minimum points as a minimum air amount VT; and air amount minimizing means for, in a case where the operation condition is established and the minimum value of the air amount index is greater than the target value, changing the valve timing of the intake valve towards the minimum air amount VT.

A sixth aspect of the present invention is a control device for internal combustion engine, comprising:

valve timing varying means that is capable of changing a valve timing of an intake valve, and intake valve control means for setting a target value of an air amount index in which an air amount in a cylinder is reflected, and also calculating a target valve timing that is a target value of the valve timing of the intake valve based on the target value of the air amount index, and controlling the valve timing of the intake valve so that the valve timing matches the target valve timing by driving the valve timing varying means;

wherein the intake valve control means comprises:

minimum air amount VT calculation means for, in a case where a predetermined operation condition that a plurality of local minimum points exist on a characteristic line representing a relation between the valve timing of the intake valve and the air amount index is established, calculating a valve timing corresponding to a minimum value of the air amount index among the respective local minimum points as a minimum air amount VT; and air amount minimizing means for, in a case where the operation condition is established and the minimum value of the air amount index is greater than the target value, changing the valve timing of the intake valve towards the minimum air amount VT.

A seventh aspect of the present invention, further comprising:

a supercharger that supercharges intake air utilizing an exhaust pressure of the internal combustion engine, wherein the control device is configured to determine that the operation condition is established in a case where a transition period that extends from before occurrence of scavenging to after occurrence thereof arrives.

Advantageous Effects of Invention

According to the first invention, when a maximum value of an air amount index is less than a target value, the target value cannot be realized at any local maximum point on a characteristic line of the air amount index. However, in this case, if the current valve timing of the intake valve is changed towards a maximum air amount VT, the air amount index can be caused to arrive at a maximum value that is the optimal point at the current time. That is, the direction in which to change the valve timing of the intake valve is determined based on the maximum air amount VT that is calculated irrespective of a change tendency (slope) of the characteristic line or the like at the current time. Accordingly, even when a plurality of local maximum points exist on a characteristic line of an air amount index, the valve timing can be prevented from being guided by the slope of the characteristic line or the like and latching onto a local maximum point that is not the optimal point. It is thereby possible to change the valve timing in the appropriate direction to optimize the air amount index and to improve the response and the driving sensation.

According to the second invention, since a condition that "maximum value of air amount index>target value" holds, a point at which the air amount index becomes equal to the target value exists around the maximum air amount VT. Further, since a condition that "target value>air amount index at current time" holds, if the valve timing of the intake valve is changed towards the maximum air amount VT, the air amount index will arrive at a point at which the air amount index is equal to the target value. Accordingly, air amount increasing means ignores local maximum points at which the air amount index does not reach the target value, and changes the valve timing towards the maximum air amount VT. As a result, the air amount index can be made equal to the target value.

According to the third invention, since a condition that "maximum value of air amount index>target value" holds, a point at which the air amount index becomes equal to the target value exists around the maximum air amount VT. Further, since a condition that "air amount index at the current time>target value" holds, it can be considered that, in a state in which the air amount index at the current time exceeds the target value, the air amount index at the current time is around the maximum value of the air amount index. Accordingly, air amount decreasing means changes the valve timing of the intake valve in a direction in which the air amount index decreases, so that the air amount index approaches the target value. As a result, the air amount index can be made equal to the target value.

According to the fourth invention, fundamentally, vicinity searching means can be actuated depending on the degree of proximity between the air amount index at the current time and the target value, while controlling the valve timing of the intake valve by a method described in any one of the first to third inventions. As a result, it is possible to efficiently optimize the air amount index in accordance with the circumstances, and thus improve the response.

According to the fifth invention, even in a case where a plurality of local minimum points exist on a characteristic line of the air amount index, it is possible to prevent the valve timing from being guided by a change tendency (slope) of the characteristic line or the like at the current time and latching onto a local minimum point that is not the optimal point. As a result, the valve timing of the intake valve can be changed in the appropriate direction to optimize the air amount index, and the response and driving sensation can be improved.

According to the sixth invention, even in a case where a plurality of local minimum points exist on a characteristic line of the air amount index, similarly to the aforementioned fifth invention, the valve timing of the intake valve can be changed in the appropriate direction to optimize the air amount index, and the response and driving sensation can be improved.

According to the seventh invention, when a transition period that extends from before the occurrence of scavenging until after the occurrence thereof has arrived, it is determined that the aforementioned operation condition is established, and any one of the air amount maximizing means, the air amount increasing means, the air amount decreasing means and the vicinity searching means can be actuated. Therefore, even in a case where a plurality of local maximum points (or local minimum points) appear on a characteristic line of an air amount index due to scavenging, the air amount index can be stably controlled.

BRIEF DESCRIPTION OF DRAWINGS

FIG. 2 is characteristics diagrams that illustrate the behavior of the valve timing of the intake valve in one example of VVT control according to the conventional technology.

DESCRIPTION OF EMBODIMENTS

Embodiment 1

Configuration of Embodiment 1

Figure 1:
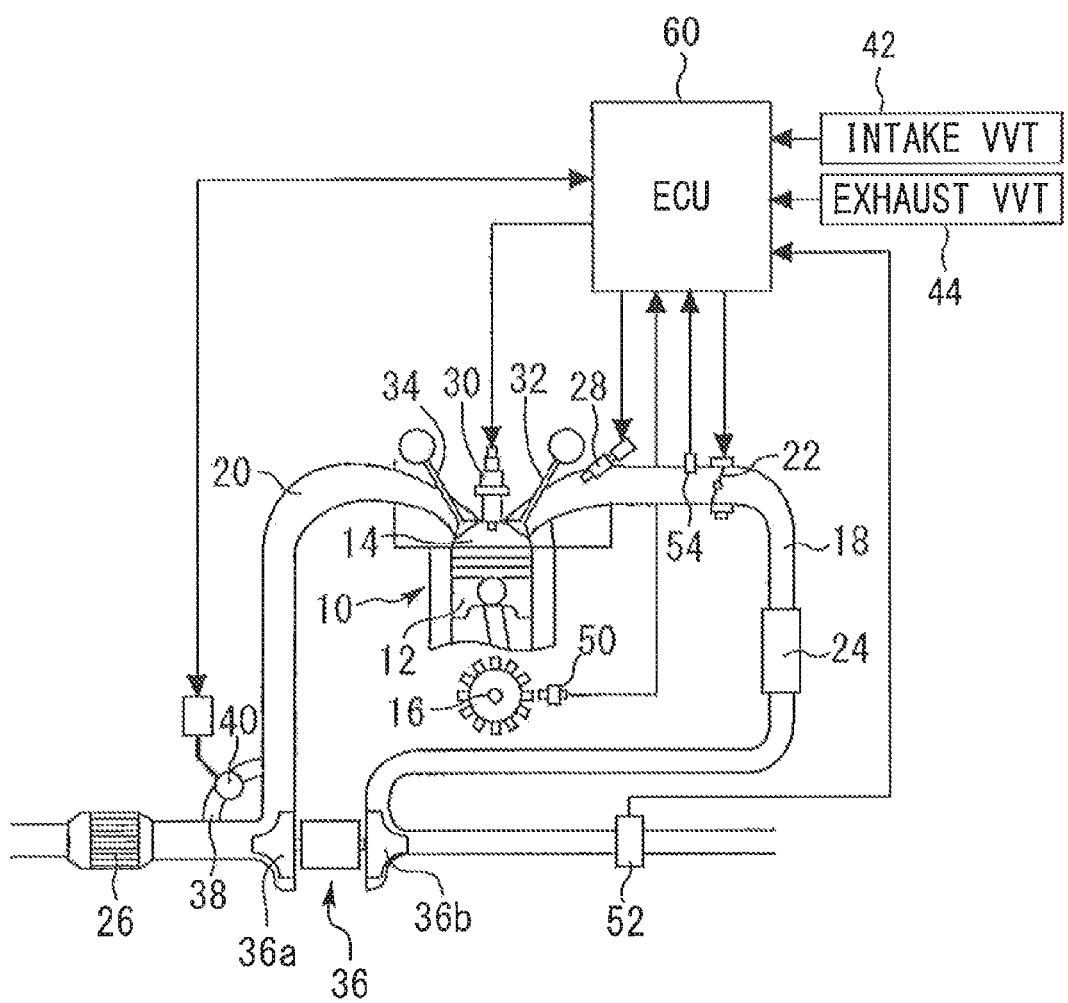
FIG. 1 is an overall configuration diagram for describing the system configuration of Embodiment 1 of the present invention.

Hereunder, Embodiment 1 of the present invention is described with reference to FIG. 1 and FIG. 5. FIG. 1 is an overall configuration diagram for describing the system configuration of Embodiment 1 of the present invention. The system of the present embodiment includes an engine 10 as an internal combustion engine. In each cylinder of the engine 10, a combustion chamber 14 is formed by a piston 12, and the piston 12 is connected to a crankshaft 16 of the engine. The engine 10 includes an intake passage 18 that is connected to an intake port of each cylinder and draws intake air into the combustion chamber 14 (into the cylinder), and an exhaust passage 20 that is connected to an exhaust port of each cylinder and through which exhaust gas is discharged from inside the respective cylinders. An electronically controlled throttle valve 22 that adjusts an intake air amount and an intercooler 24 that cools intake air are provided in the intake passage 18. A catalyst 26 that purifies exhaust gas is provided in the exhaust passage 20. Each cylinder is provided with a fuel injection valve 28 that injects fuel into the intake port thereof, a spark plug 30 that ignites an air-fuel mixture in the cylinder, an intake valve 32 that opens and closes the intake port with respect to the inside of the cylinder, and an exhaust valve 34 that opens and closes the exhaust port with respect to the inside of the cylinder.

The engine 10 also includes a known turbosupercharger 36 that supercharges intake air utilizing an exhaust pressure. The turbosupercharger 36 is constituted by a turbine 36a that is provided in the exhaust passage 20, and a compressor 36b that is provided in the intake passage 18. The compressor 36b is driven by the turbine 36a that receives an exhaust pressure, and supercharges intake air. A bypass passage 38 that bypasses the turbine 36a, and a waste gate valve 40 that adjusts the amount of exhaust gas flowing through the bypass passage 38 are also provided in the exhaust passage 20.

The engine 10 further includes an intake VVT 42 and an exhaust VVT 44 as valve timing varying means. The intake VVT 42 changes the valve timing (phase) of the intake valve 32, and has a known configuration as described, for example, in Japanese Patent Laid-Open No. 2000-87769. More specifically, the intake VVT 42 is disposed between a camshaft having a cam that drives the intake valve, and a cam pulley that is rotationally driven by the crankshaft. A configuration is adopted so that, when the camshaft and the cam pulley are caused to rotate relative to each other, the phase of the intake valve 32 is advanced or retarded in accordance with the rotational angle. Note that the valve timing varying means that is used in the present invention is not limited to a VVT, and it is sufficient that the valve timing varying means includes a function that changes at least one of the opening timing, the closing timing and the phase of the intake valve 32. On the other hand, the exhaust VVT 44 has approximately the same configuration as the intake VVT 42, and changes the valve timing of the exhaust valve 34.

Next, the control systems of the system will be described. The system of the present embodiment is equipped with a sensor system that includes various sensors that are required for control of the engine 10 and the vehicle, and an ECU (electronic control unit) 60 for controlling the operating state of the engine 10. First, the sensor system will be described. A crank angle sensor 50 outputs a signal that is synchronous with rotation of the crankshaft 16. An air flow sensor 52 detects an intake air amount of the engine, and an intake air pressure sensor 54 detects an intake air pressure (supercharging pressure) of the engine. The sensor system also includes a water temperature sensor that detects the temperature of the engine cooling water, and an accelerator sensor that detects an accelerator operation amount of the driver, and the like.

The ECU 60, is constituted by an arithmetic processing apparatus that includes a storage circuit such as a ROM or a RAM, and an input/output port for example. Each of the sensors described above are connected to the input side of the ECU 60, respectively. Various actuators including the throttle valve 22, the fuel injection valve 28, the spark plug 30, the WGV 40, and the VVTs 42 and 44 are connected to the output side of the ECU 60. The ECU 60 controls operation of the engine by driving the respective actuators based on information regarding operation of the engine that is detected by means of the sensor system. More specifically, the ECU 60 detects a number of engine revolutions (engine rotational speed) NE and the crank angle based on an output of the crank angle sensor 50, and calculates a load KL of the engine based on the intake air amount detected by the air flow sensor 52 and the number of engine revolutions. The ECU 60 also calculates a fuel injection amount based on the number of engine revolutions, the load, the water temperature and the like, and determines the fuel injection timing and the ignition timing based on the crank angle. For each cylinder, the ECU 60 drives the fuel injection valve 28 at a time point at which the fuel injection timing has been reached, and drives the spark plug 30 at a time point at which the ignition timing has been reached. Thus, an air-fuel mixture inside the respective cylinders can be burned to operate the engine 10. Further, the ECU 60 has a function that executes VT optimization control that is described later, and constitutes intake valve control means of the present embodiment.

[Features of Embodiment 1]

First, a problem with the control that is performed according to the conventional technology will be described. FIGS. 2(A) and 2(B) are characteristics diagrams that illustrate the behavior of the valve timing of the intake valve in one example of VVT control according to the conventional technology. In these figures, a load characteristic line (air amount characteristic line) is shown that illustrates the relation between a valve timing VT of the intake valve and a load KL. Note that these figures are based on the premise of a case in which other operation conditions are fixed. FIG. 2(A) illustrates a case where a single local maximum point exists on the load characteristic line. FIG. 2(B) illustrates a case where a plurality of (for example, two) local maximum points exist on the load characteristic line. Further, the load KL corresponds to one example of an air amount index in the present embodiment, and has a characteristic such that, as the air amount that is drawn into the cylinders increases, the air amount in question is reflected in the load KL and the load KL increases.

One example of the conventional technology will now be described. In the VVT control, a target value (target KL) of the load KL is set based on the operating state of the engine and the like, and a target value (target valve timing) of the valve timing of the intake valve is calculated based on the target KL. The valve timing of the intake valve is then controlled by driving the intake VVT so that the actual valve timing matches the target valve timing. More specifically, first, as shown in FIG. 2(A), in a case where there is only one local maximum point, if the current load KL (load KL at the current time point) is less than the target KL, the valve timing is changed from the current value in a direction in which the load KL increases. Further, if the current load KL is greater than the target KL, the valve timing is changed in a direction in which the load KL decreases. At this time, the direction in which the load KL increases (decreases) is determined based on, for example, a change characteristic (slope of the current load characteristic line) of the load KL that is obtained by minutely changing the valve timing.

However, according to the above described VVT control, as shown in FIG. 2(B), in a case where there are a plurality of local maximum points, there is a risk that the valve timing will be changed in the wrong direction. That is, for example, in a case where a local maximum point that is a point at which the load KL has not arrived at the target KL exists in the vicinity of the current valve timing, there is a possibility that the valve timing will be changed towards the incorrect local maximum point based on the change characteristic of the current load KL. In this case, irrespective of the fact that another local maximum point that is the optimal point exists, the control latches onto the incorrect local maximum point, and therefore the optimal load KL is not realized and the response is liable to deteriorate. Further, if an increase in the intake air pressure from this state or the like occurs and the local maximum point which had been the target disappears, since the VVT immediately operates to rapidly change the air amount (load), in some cases an uncomfortable driving sensation arises.

(VT Optimization Control)

Figure 3:
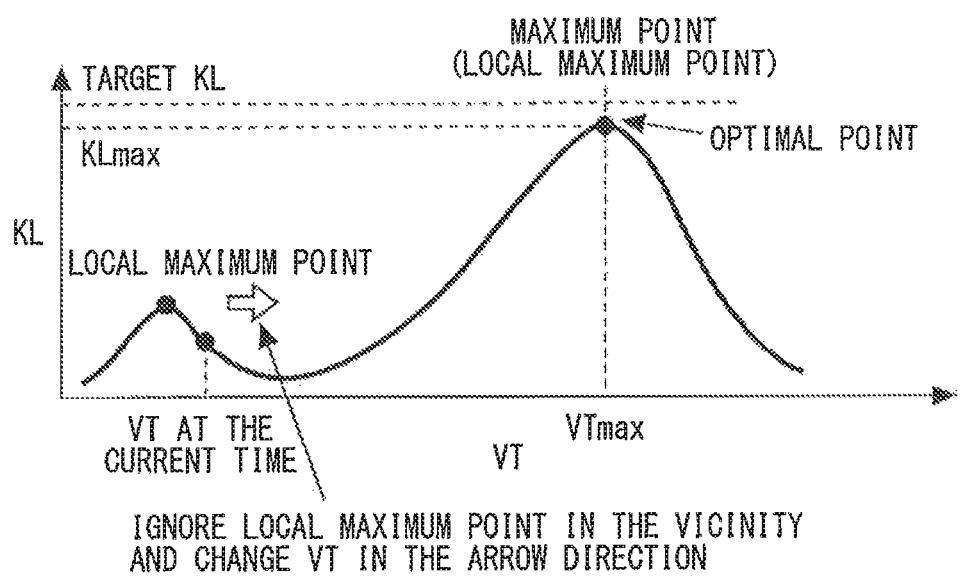
FIG. 3 is a characteristics diagram that illustrates one example of VT optimization control according to Embodiment 1 of the present invention.

Therefore, according to the present embodiment, while executing similar VVT control as in the conventional technology, VT optimization control is executed in a case where a specific operating state is established as described below. Note that, in the following description, for example, it is assumed that the phase is changed in an advancing direction when the valve timing VT of the intake valve 32 is increased, and when the valve timing VT is decreased the phase is changed in a retarding direction. Further, the valve timing of the 34 32 may also be referred to as simply "valve timing" or "VT". FIG. 3 is a characteristics diagram that illustrates one example of VT optimization control according to Embodiment 1 of the present invention. According to the VT optimization control, in a case where a specific operation condition that a plurality of local maximum points exist on a load characteristic line is established, processing to calculate a maximum air amount VT as well as air amount maximization processing that are described later are executed.

Here, a transition period that extends from before the occurrence of scavenging (blow-by of fresh air from the intake system to the exhaust system) to after the occurrence thereof or the like may be mentioned as an example of a case where the above described specific operation condition is established. The ECU 60 detects the occurrence of scavenging based on the length of a valve overlap period in which the intake valve 32 and the exhaust valve 34 open as well as an exhaust air-fuel ratio in the valve overlap period and the like. For example, the ECU 60 determines that the specific operation condition is established during a period from when scavenging occurred until the state (flow quantity, flow velocity and the like) of the intake air becomes a steady state.

(Processing to Calculate Maximum Air Amount VT)

According to the VT optimization control, a maximum air amount VT (VTmax) is calculated in a case where the specific operation condition has been established. VTmax is defined as a valve timing that corresponds to a maximum value KLmax of the load KL on a load characteristic line shown in FIG. 3 or the like. Since the waveform of the load characteristic line changes in accordance with various operation parameters, a multidimensional data map for calculating VTmax based on a plurality of operation parameters is previously stored in the ECU 60. For example, an intake air pressure (supercharging pressure) Pm, the number of engine revolutions NE, the degree of opening of the waste gate valve 40 and the like may be mentioned as operation parameters that serve as arguments of the data map. Further, a data map that shows a relation between VTmax and the maximum value KLmax of the load is previously stored in the ECU 60. After calculating VTmax, the ECU 60 calculates the maximum value KLmax of the load that corresponds to VTmax based on this data map and the like.

(Air Amount Maximization Processing)

Since the VT optimization control is executed in a case in which the aforementioned specific operation condition is established, as shown in FIG. 3, when the maximum value KLmax of the load is less than the target KL, the valve timing of the intake valve 32 is changed towards VTmax. At such time, even if a local maximum point exists in a different direction to the change direction (arrow direction) of the VT in the vicinity of the current valve timing (VT), the local maximum point is ignored and the VT changes in the arrow direction. That is, the VT changes towards VTmax in a manner that ignores the change tendency (slope) of the load characteristic line with respect to the current VT, and the changing operation in question ends at the time point at which the VT arrives at VTmax.

According to the above described control, the following actions and effects can be obtained. In a case where the maximum value KLmax of the load is less than the target KL, the target KL cannot be realized at any local maximum point on the load characteristic line. However, in this case, if the current VT is changed towards VTmax, the load KL can be caused to arrive at the maximum value KLmax that is the optimal point at the current time. That is, the direction in which the VT is changed is determined based on VTmax that is calculated irrespective of the change tendency (slope) and the like of the load characteristic line at the current time. Accordingly, even when there are a plurality of local maximum points on a load characteristic line, the VT can be prevented from being guided by the slope of the load characteristic line or the like and latching onto a local maximum point that is not the optimal point, and thus the VT can be changed in the appropriate direction and the load KL can be optimized.

[Specific Processing for Realizing Embodiment 1]

Figure 4:
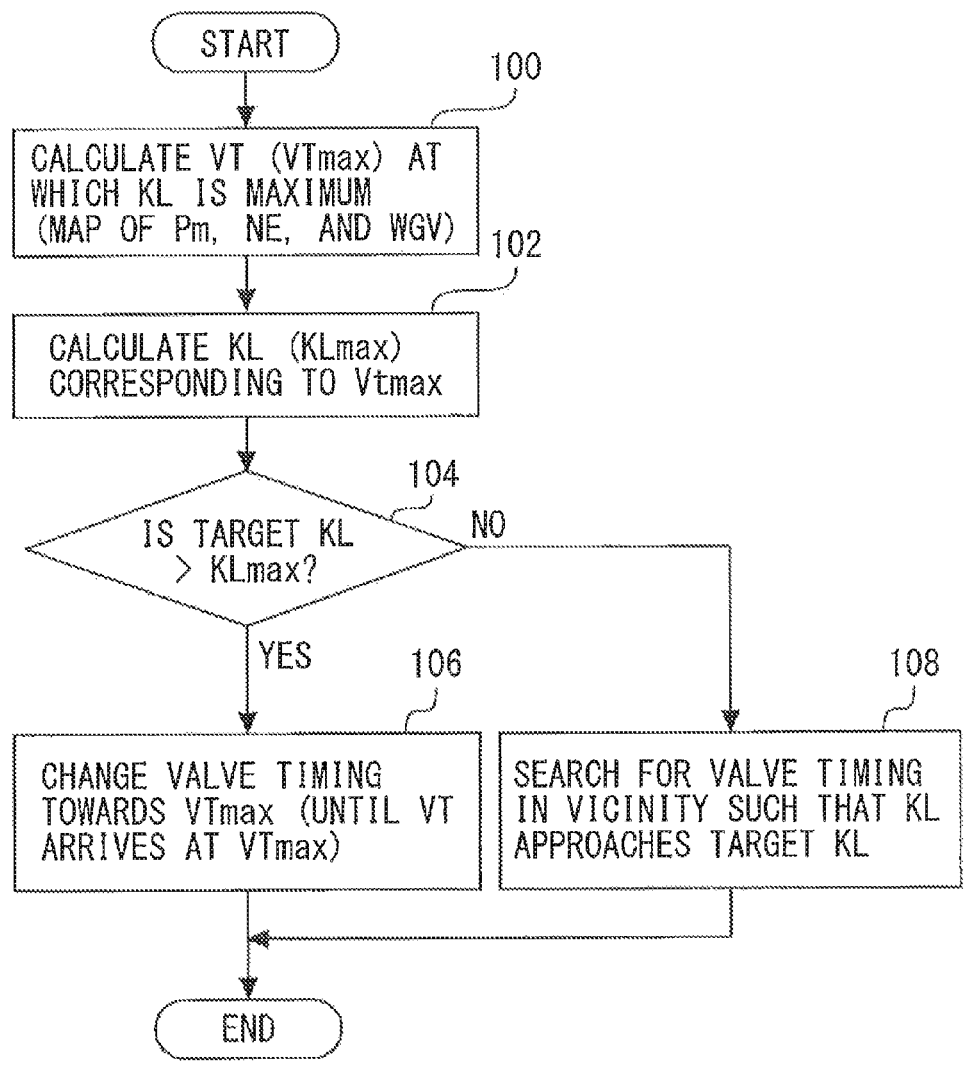
FIG. 4 is a flowchart that illustrates an example of control that is executed by the ECU according to Embodiment 1 of the present invention.

Next, specific processing for implementing the above described control will be described referring to FIG. 4. FIG. 4 is a flowchart that illustrates an example of control that is executed by the ECU according to Embodiment 1 of the present invention. The routine shown in FIG. 4 is repeatedly executed during operation of the engine, and the routine illustrates processing in a case where the specific operation condition has been established. In the routine shown in FIG. 4, first, in step 100, as described in the foregoing, the ECU 60 calculates VTmax at which the load KL becomes the maximum load in the current operating state. Next, in step 102, the ECU 60 calculates the maximum value KLmax of the load that corresponds to VTmax.

Next, in step 104, the ECU 60 determines whether or not the maximum value KLmax of the load is less than the target KL. If the result determined in step 104 is affirmative, the processing shifts to step 106 in which the ECU 60 changes the valve timing VT of the intake valve 32 towards VTmax. The ECU 60 ends the changing operation at the time point at which VT arrives at VTmax. On the other hand, if the result determined in step 104 is negative, the processing shifts to step 108 in which the ECU 60 searches for an appropriate valve timing in the vicinity of the current VT such that the load KL approaches the target KL. More specifically, in step 108, the ECU 60 calculates the load KL while changing the VT little by little, and changes the VT in the direction in which a difference between the load KL and the target KL decreases. The ECU 60 ends the changing operation at the time point at which the difference has become the minimum difference.

Figure 5:
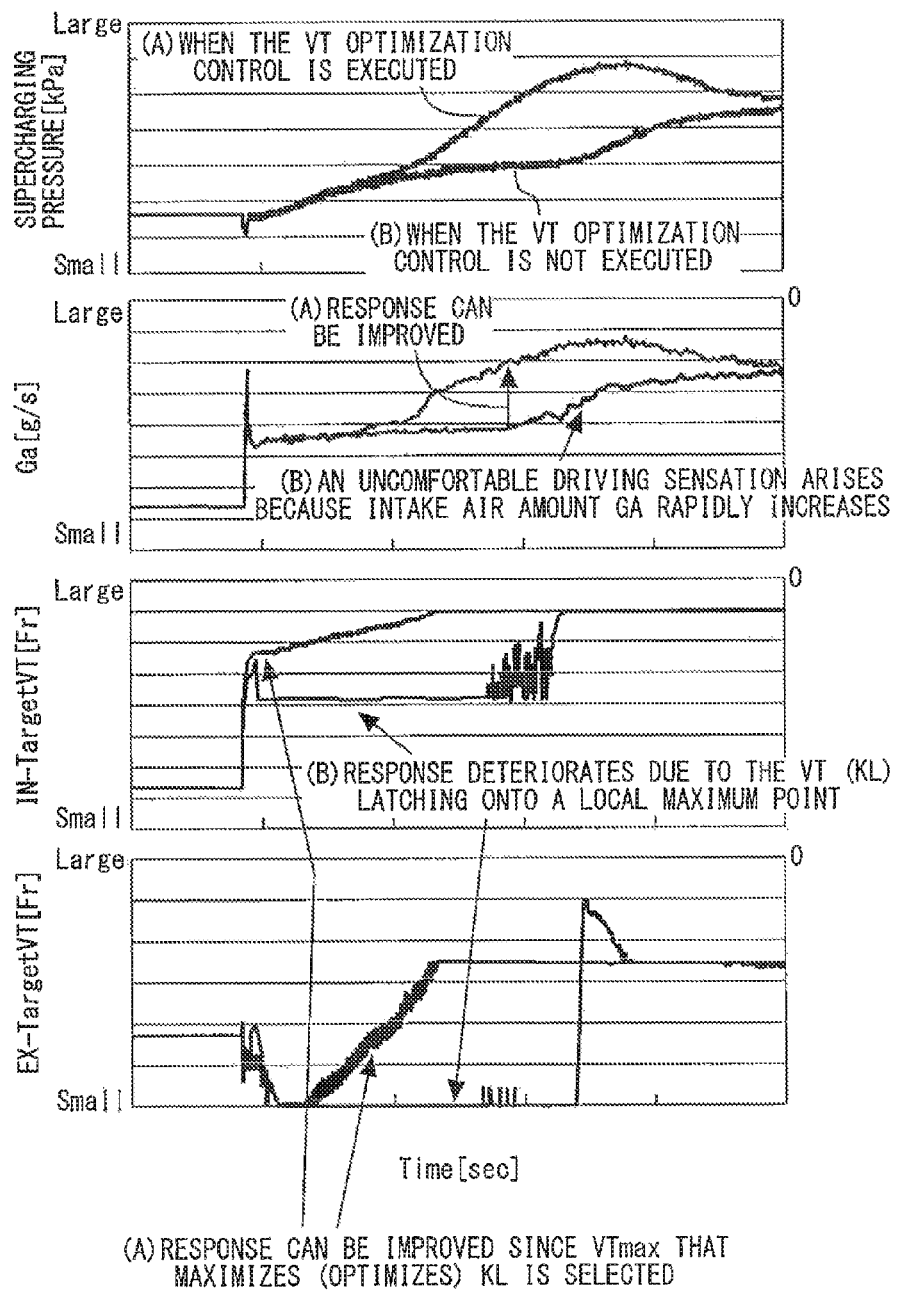
FIG. 5 is a timing chart that shows a comparison between an effect that improves the drivability that is produced by the VT optimization control and a state when the VT optimization control is not executed.

Next, an effect that improves the drivability that is produced by the VT optimization control is described referring to FIG. 5. FIG. 5 is a timing chart that shows a comparison between an effect that improves the drivability that is produced by the VT optimization control and a state when the VT optimization control is not executed. FIG. 5 illustrates an example in a case where the specific operation condition has been established in a situation in which, as the result of an acceleration operation or the like, the turbosupercharger 36 operates and the supercharging pressure rises. Further, in FIG. 5, reference character (A) denotes a characteristic line that corresponds to a time when the VT optimization control is executed, and reference character (B) denotes a characteristic line that corresponds to a time when the VT optimization control is not executed.

As shown in FIG. 3, when the VT optimization control is not executed, in some cases the response deteriorates due to the VT (KL) latching onto a local maximum point that is not the optimal point among a plurality of local maximum points that appear on the load characteristic line. Further, if the aforementioned local maximum point disappears due to a change in the operating state or the like, the VT changes suddenly and the intake air amount Ga rapidly increases, and consequently an uncomfortable driving sensation arises. In contrast, when the VT optimization control is executed, since VTmax that maximizes (optimizes) KL is selected as described in the foregoing, in comparison to the case where the VT optimization control is not executed, the intake air amount Ga can be quickly increased and the response can be improved. Further, since a situation does not arise in which the VT latches onto a local maximum point that is not the optimal point (maximum value), the intake air amount Ga does not change suddenly due to the disappearance of a local maximum point, and thus the drivability can be enhanced. In particular, in an engine with a supercharger, in a case where a transition period that extends from before the occurrence of scavenging to after the occurrence thereof has arrived, the above described effect can be noticeably obtained.

Note that, in the above described Embodiment 1, step 100 in FIG. 4 represents a specific example of maximum air amount VT calculation means, and the processing from step 104 to step 106 represents a specific example of air amount maximizing means. Further, according to Embodiment 1, a transition period that extends from before the occurrence of scavenging to after the occurrence thereof is exemplified as one example of a case in which the above described specific operation condition is established. However, the present invention is not limited thereto, and a configuration may also be adopted in which, when an arbitrary operating state in which a plurality of local maximum points appear on a load characteristic line is realized, it is determined that the specific operation condition is established and the VT optimization control is executed. Further, although the engine 10 with a supercharger is adopted as an example of an internal combustion engine in Embodiment 1, the present invention is not limited thereto and may also be applied to an internal combustion engine that does not have a supercharger.

Embodiment 2

Next, Embodiment 2 of the present invention will be described referring to FIG. 6 and FIG. 7. A feature of the present embodiment is that processing for a case where the maximum value of an air amount index is greater than a target value is added to the same configuration and control as in the above described Embodiment 1. Note that, in the present embodiment components that are the same as in Embodiment 1 are denoted by the same reference symbols and a description of such components is omitted.

[Features of Embodiment 2]

Figure 6:
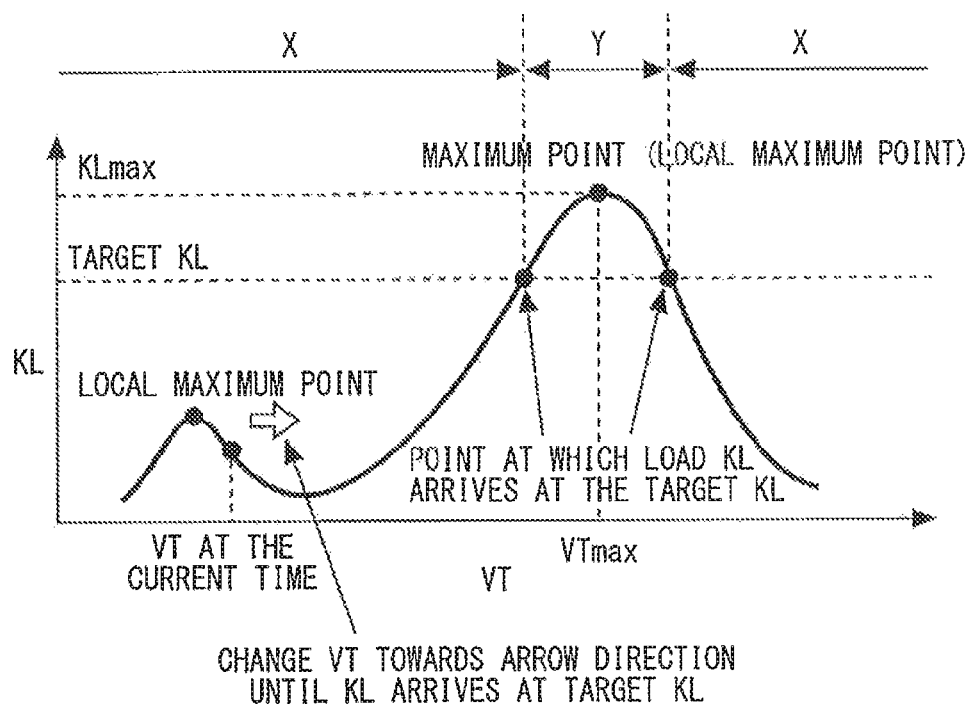
FIG. 6 is a characteristics diagram illustrating an example of VT optimization control according to Embodiment 2 of the present invention.

FIG. 6 is a characteristics diagram illustrating an example of VT optimization control according to Embodiment 2 of the present invention. As shown in FIG. 6, when the maximum value KLmax of the load is greater than the target KL, if only the control described in the foregoing Embodiment 1 is performed, there is a possibility that the VT will latch onto a local maximum point and it will not be possible to realize the target KL. Therefore, according to the present embodiment, air amount increasing processing and air amount decreasing processing that are described hereunder are executed in the VT optimization control. These respective processing operations are selectively used as appropriate depending on the magnitude relation between the load KL and the target KL at the current time point.

(Air Amount Increasing Processing)

This processing is executed in a case where, in a state in which the above described specific operation condition is established, the maximum value KLmax of the load is greater than the target KL, and the target KL is greater than the load KL at the current time (KLmax>target KL>load KL at the current time). At the time of execution, the valve timing of the intake valve 32 is changed towards VTmax until reaching a value that corresponds to the target KL. That is, in the air amount increasing processing, similarly to the foregoing Embodiment 1, the load KL is calculated while changing the VT in the arrow direction in FIG. 6, and the operation to change the VT is ended at the time point at which the calculated value of the load KL arrives at the target KL.

According to the above described processing, in a case where the condition "KLmax>target KL>load KL at the current time" is established, that is, when the current VT is positioned in section X in FIG. 6, it is considered that the situation is as follows. First, since the condition "KLmax>target KL" is established, a point at which the load KL becomes equal to the target KL exists around VTmax. Further, since the condition "target KL>load KL at the current time" is established, if the VT is changed towards VTmax, the load KL will arrive at a point at which the load KL becomes equal to the target KL. Therefore, according to the air amount increasing processing, local maximum points at which the load KL does not arrive at the target KL are ignored, and the VT is changed towards VTmax. As a result, the load KL can be made equal to the target KL and, in addition to the effects obtained according to Embodiment 1, optimization of the load KL can be promoted.

(Air Amount Decreasing Processing)

This processing is executed in a case where, in a state in which the above described specific operation condition is established, the maximum value KLmax of the load is greater than the target KL, and the target KL is less than KL at the current time (KLmax>target KL, and KL at the current time>target KL). Further, at the time of execution, the valve timing of the intake valve 32 is changed in a direction in which the load KL decreases, and the operation to change the valve timing is ended at the time point at which the load KL arrives at the target KL.

According to the above described processing, in a case where the condition "KLmax>target KL, and KL at the current time>target KL" is established, that is, when the current VT is positioned in section Y in FIG. 6, it is considered that the situation is as follows. First, since the condition "KLmax>target KL" is established, a point at which the load KL becomes equal to the target KL exists around VTmax. Further, since the condition "load KL at the current time>target KL" is established, it can be considered that the load KL at the current time exists around KLmax in a state in which the load KL exceeds the target KL. Consequently, according to the air amount decreasing processing, VT is changed in a direction in which the load KL decreases, so that the load KL approaches the target KL. Thus, the load KL can be made equal to the target KL, and optimization of the load KL can be promoted.

[Specific Processing for Realizing Embodiment 2]

Next, specific processing for implementing the above described control will be described referring to FIG. 7. FIG. 7 is a flowchart that illustrates an example of control that is executed by the ECU according to Embodiment 2 of the present invention. The routine shown in FIG. 7 is repeatedly executed during operation of the engine, and the routine illustrates processing in a case where the specific operation condition has been established. In the routine shown in FIG. 7, first, in steps 200, 202, and 204, by executing similar processing to that in steps 100, 102, and 104 of Embodiment 1 (FIG. 4), the ECU 60 calculates VTmax and KLmax, and determines whether or not the maximum value KLmax of the load is less than the target KL.

Next, in step 206, if the result determined in step 204 is affirmative, the ECU 60 changes the valve timing VT of the intake valve 32 towards VTmax, and ends the changing operation at the time point at which VT arrives at VTmax. On the other hand, if the result determined in step 204 is negative, the processing shifts to step 208 in which the ECU 60 determines whether or not the target KL is greater than the current load KL. If the result determined in step 208 is affirmative, the processing shifts to step 206 in which the ECU 60 changes the valve timing VT of the intake valve 32 towards VTmax. However, in this case, the ECU 60 ends the relevant changing operation at the time point at which the load KL arrives at the target KL.

On the other hand, if the result determined in step 208 is negative, the processing shifts to step 210. In step 210, the ECU 60 searches for an appropriate valve timing in the vicinity of the current VT so that the load KL approaches the target KL. More specifically, in step 210, for example, by determining if there is an increase or decrease in the load KL when the VT is changed by a small amount, the ECU 60 changes the VT in a direction that decreases the load KL, and ends the relevant changing operation at a time point at which the load KL arrives at the target KL.

Figure 7:
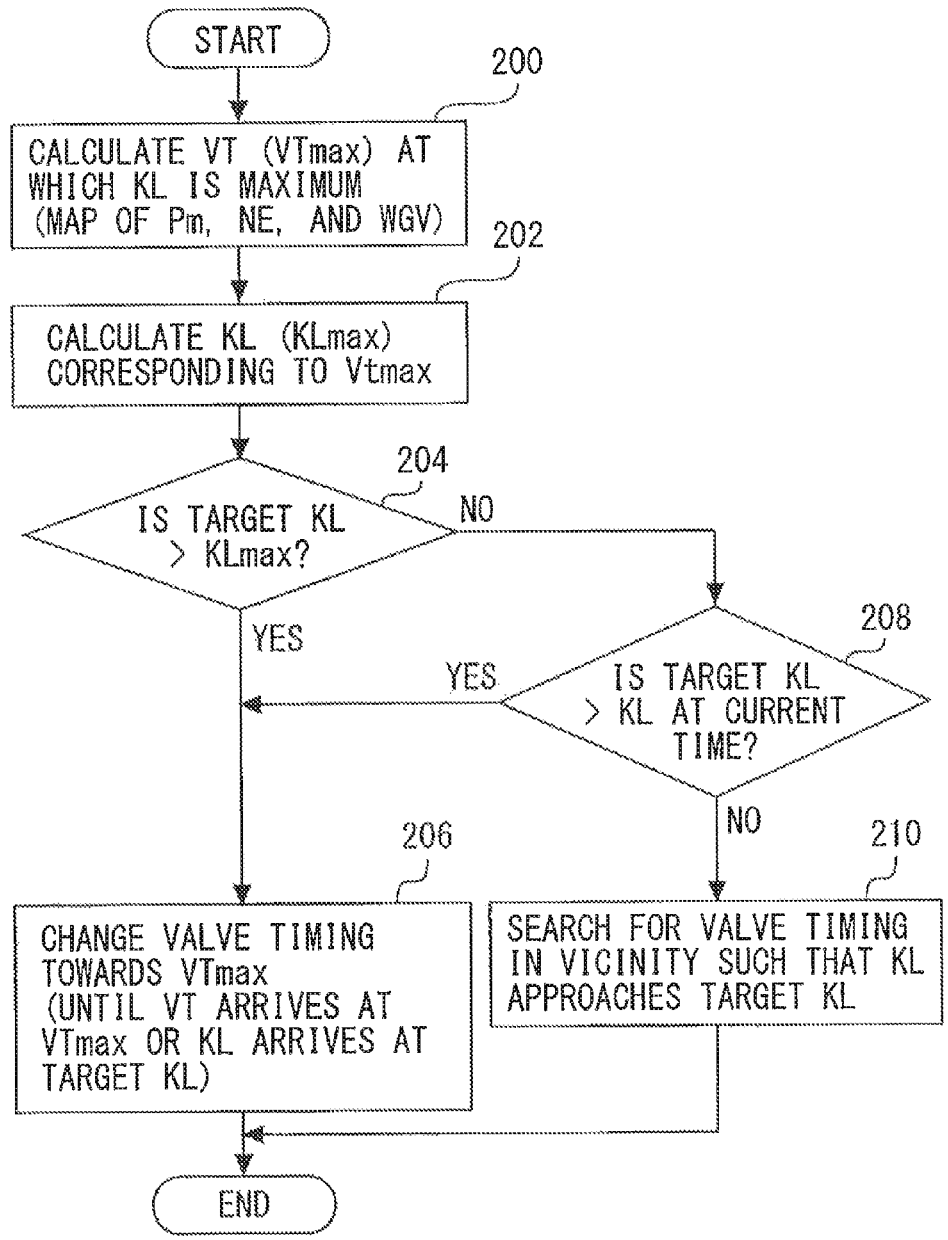
FIG. 7 is a flowchart that illustrates an example of control that is executed by the ECU according to Embodiment 2 of the present invention.

Note that, in the above described Embodiment 2, step 200 in FIG. 7 represents a specific example of maximum air amount VT calculation means, and the processing from step 204 to step 206 represents a specific example of air amount maximizing means. Further, the processing from step 208 to step 206 represents a specific example of air amount increasing means, and the processing from step 208 to step 210 represents a specific example of air amount decreasing means.

Embodiment 3

Next, Embodiment 3 of the present invention will be described referring to FIG. 8 and FIG. 9. A feature of the present embodiment is that processing for a case where a difference between the air amount index at the current time and the target value is small is added to the same configuration and control as in the above described Embodiment 1. Note that, in the present embodiment components that are the same as in Embodiment 1 are denoted by the same reference symbols and a description of such components is omitted.

[Features of Embodiment 3]

Figure 8:
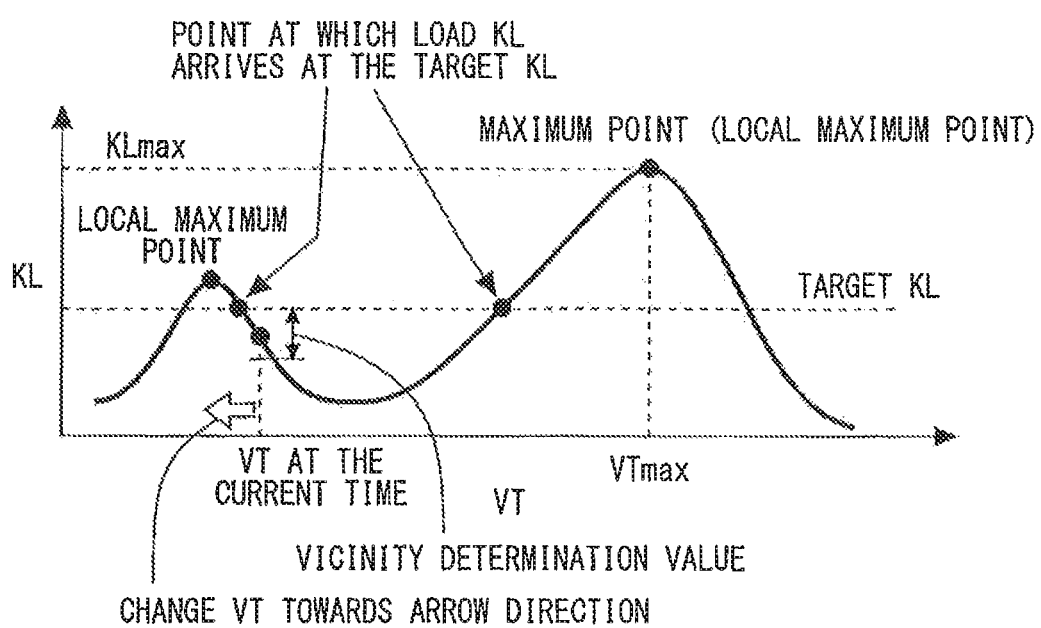
FIG. 8 is a characteristics diagram illustrating an example of VT optimization control according to Embodiment 3 of the present invention.

FIG. 8 is a characteristics diagram illustrating an example of VT optimization control according to Embodiment 3 of the present invention. As shown in FIG. 8, in a case where the current VT is positioned in the vicinity of a VT (target VT) that corresponds to the target KL, there is a possibility that the response will deteriorate if the VT is changed towards VTmax that is positioned beyond the target VT. Therefore, according to the present embodiment, vicinity searching processing that is described below is executed in the VT optimization control.

(Vicinity Searching Processing)

In a case where a difference ΔKL between the current load KL and the target KL is smaller than a predetermined vicinity determination value S (S>ΔKL) in a state in which the aforementioned specific operation condition is established, this processing changes the valve timing of the intake valve 32 in a direction in which the difference ΔKL decreases. Here, the vicinity determination value S is set, for example, as a small value such that the target KL can be quickly achieved even if the VT is changed in a direction away from VTmax. When executing the vicinity searching processing, the ECU 60 calculates the load KL and the difference ΔKL while changing the VT, and ends the operation to change the VT at the time point at which the difference ΔKL becomes zero.

According to the above described processing, fundamentally, vicinity searching processing can be executed depending on the degree of proximity between the load KL at the current time and the target KL, while executing the air amount maximization processing described in the foregoing Embodiment 1. As a result, in addition to obtaining the effects of Embodiment 1, it is also possible to efficiently optimize the load KL in accordance with the circumstances, and thus improve the response.

[Specific Processing for Realizing Embodiment 3]

Next, specific processing for implementing the above described control will be described referring to FIG. 9. FIG. 9 is a flowchart that illustrates an example of control that is executed by the ECU according to Embodiment 3 of the present invention. The routine shown in FIG. 9 is repeatedly executed during operation of the engine, and the routine illustrates processing in a case where the specific operation condition has been established. In the routine shown in FIG. 9, first, in steps 300, 302, and 304, by executing similar processing to that in steps 100, 102, and 104 of Embodiment 1 (FIG. 4), the ECU 60 calculates VTmax and KLmax, and determines whether or not the maximum value KLmax of the load is less than the target KL.

Next, in step 306, if the result determined in step 304 is affirmative, the ECU 60 changes the valve timing VT of the intake valve 32 towards VTmax, and ends the changing operation at the time point at which VT arrives at VTmax. On the other hand, if the result determined in step 304 is negative, the processing shifts to step 308. In step 308, for example, by subtracting the load KL at the current time from the target KL, the ECU 60 calculates the difference ΔKL (=target KL−load KL at the current time) between the two values, and determines whether or not the difference ΔKL is greater than the vicinity determination value S.

If the result determined in step 308 is affirmative, since it can be considered that the current VT is at a position that is separated from the target VT, the processing shifts to step 306 in which the ECU 60 changes the valve timing VT of the intake valve 32 towards VTmax. In this case, in step 306, as described in the foregoing Embodiment 2, depending on the magnitude relation between the load KL at the current time and the target KL, either one of air amount increasing processing and air amount decreasing processing is executed. On the other hand, if the result determined in step 308 is negative, since the current VT is at a position in the vicinity of the target VT, the processing shifts to step 310 in which the ECU 60 executes the above described vicinity searching processing. That is, in step 310, the ECU 60 searches for an appropriate valve timing in the vicinity of the current VT such that the load KL approaches the target KL.

Figure 9:
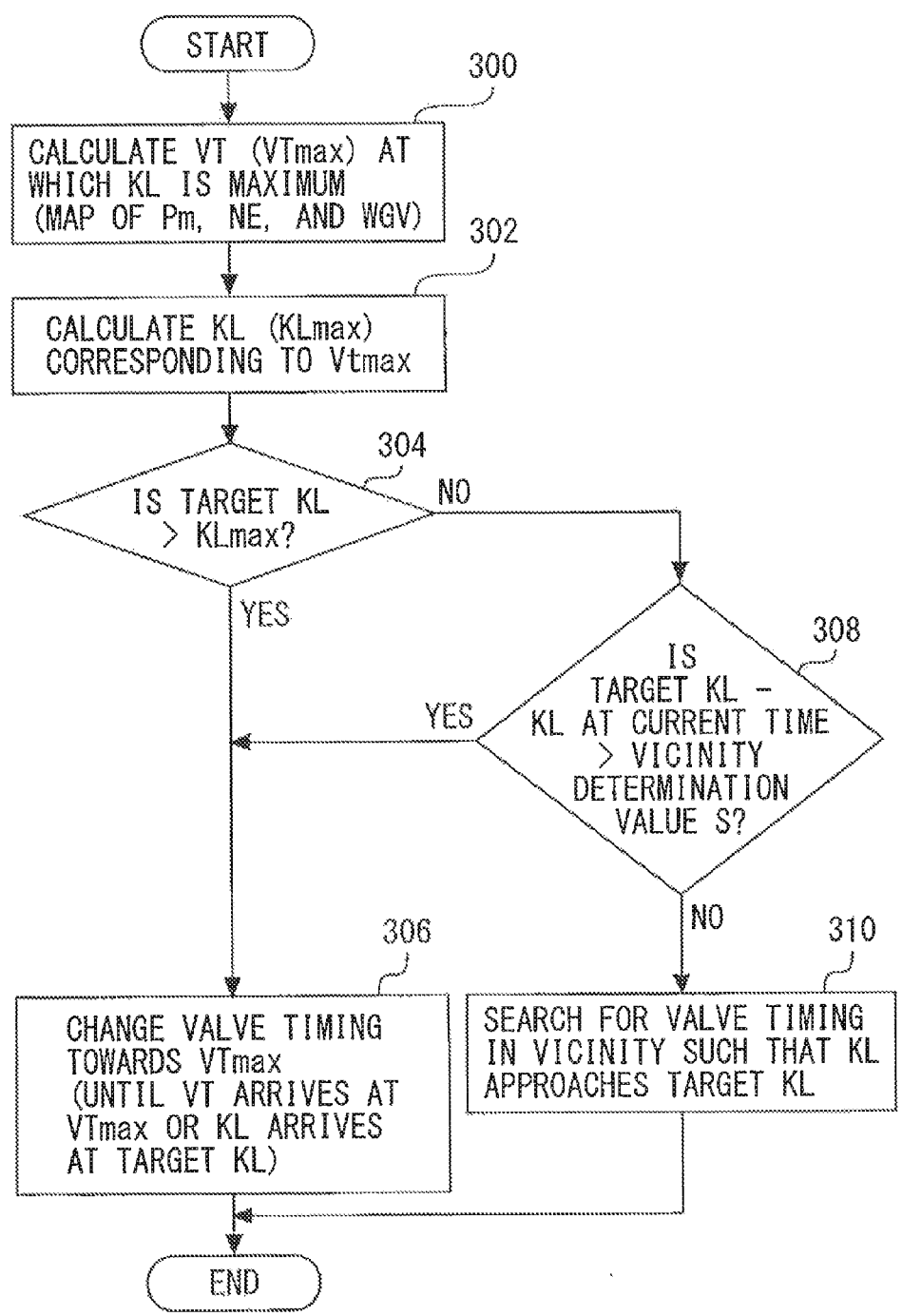
FIG. 9 is a flowchart that illustrates an example of control that is executed by the ECU according to Embodiment 3 of the present invention.

Note that, in the above described Embodiment 3, step 300 in FIG. 9 represents a specific example of maximum air amount VT calculation means, and the processing from step 304 to step 306 represents a specific example of air amount maximizing means. Further, the processing from step 308 to step 310 represents a specific example of vicinity searching means.

Embodiment 4

Next, Embodiment 4 of the present invention will be described referring to FIG. 10 and FIG. 11. A feature according to the present embodiment is that VT optimization control is applied with respect to a case where a plurality of local minimum points exist on an air amount characteristic line (load characteristic line). Note that, in the present embodiment components that are the same as in Embodiment 1 are denoted by the same reference symbols and a description of such components is omitted.

[Features of Embodiment 4]

Figure 10:
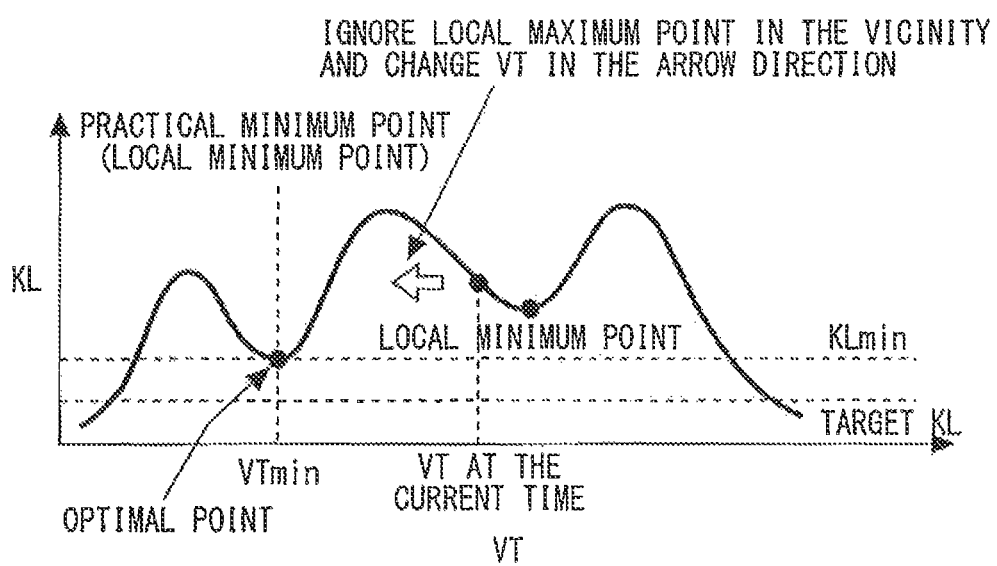
FIG. 10 is a characteristics diagram illustrating an example of VT optimization control according to Embodiment 4 of the present invention.

FIG. 10 is a characteristics diagram illustrating an example of VT optimization control according to Embodiment 4 of the present invention. As shown in FIG. 10, VT optimization control can also be applied to a case where it is desired to minimize the load KL in a situation in which a plurality of local minimum points exist on the load characteristic line. A specific example will now be described. In this VT optimization control, first, in a case where a specific operation condition that a plurality of local minimum points exist on a load characteristic line is established, a valve timing at which the load KL becomes a practical minimum value KLmin among the respective local minimum points is calculated as a minimum air amount VT (VTmin). In this case, for example, a transition period that extends from before the occurrence of scavenging to after the occurrence thereof or the like may be mentioned as the specific operation state.

A multidimensional data map for calculating VTmin based on a plurality of operation parameters is previously stored in the ECU 60. The same operation parameters as those of the data map used to calculate the aforementioned VTmax may be mentioned as the arguments of this data map. Further, a data map showing the relation between VTmin and a minimum value KLmin of the load is also previously stored in the ECU 60. After calculating VTmin, the ECU 60 calculates the minimum value KLmin of the load that corresponds to VTmin based on this data map and the like.

Further, in the VT optimization control, in a case where the specific operation condition has been established and the minimum value KLmin of the load is greater than the target KL (KLmin>target KL), processing (air amount minimization processing) is executed that changes the valve timing of the intake valve 32 towards VTmin. According to this processing, as shown in FIG. 10, even if a local minimum point that is in a direction that is different to the change direction (arrow direction) of the VT exists in the vicinity of the current valve timing VT, the aforementioned local minimum point is ignored and the VT is changed in the arrow direction. That is, the change tendency (slope) of the load characteristic line with respect to the current VT is ignored, and the VT is changed towards VTmin.

Further, in a case where the minimum value KLmin of the load is less than the target KL (target KL>KLmin), second air amount increasing processing and second air amount decreasing processing are selectively used as appropriate depending on the magnitude relation between the load KL at the current time and the target KL. Note that, first air amount increasing processing and first air amount decreasing processing are the processing operations described in the foregoing Embodiment 2, respectively. In the present embodiment, when the load KL at the current time is less than the target KL (target KL>load KL at the current time), the second air amount increasing processing changes the valve timing of the intake valve 32 towards VTmin until reaching a value that corresponds to the target KL. Further, when the load KL at the current time is greater than the target KL (load KL at the current time>target KL), the second air amount decreasing processing changes the valve timing in a direction in which the load KL decreases, and ends the relevant changing operation at a time point at which the load KL arrives at the target KL.

The following actions and effects can be obtained according to the above described air amount minimization processing. When the minimum value KLmin of the load is greater than the target KL, the target KL cannot be realized at any local minimum point on the load characteristic line. However, in this case, if the current VT is changed towards VTmin, the load KL can be caused to arrive at the minimum value KLmin that is the optimal point at the current time. Therefore, even when there are a plurality of local minimum points on the load characteristic line, it is possible to prevent the VT from being guided by a change tendency (slope) of the load characteristic line or the like at the current time and latching onto a local minimum point that is not an optimal point, and the VT can be changed in the appropriate direction to optimize the load KL.

Further, according to the second air amount increasing processing, a local minimum point at which the load KL does not arrive at the minimum value KLmin can be ignored, and the VT can be appropriately changed towards VTmin. In addition, according to the second air amount decreasing processing, the VT can be changed in a direction in which the load KL decreases, so that the load KL approaches the target KL. Therefore, by performing these processing operations, the load KL can be made equal to the target KL. Thus, according to the present embodiment, when it is desired to minimize the load KL in a situation in which a plurality of local minimum point exist on a load characteristic line, the same effects as in the above described Embodiment 1 can be obtained.

[Specific Processing for Realizing Embodiment 4]

Next, specific processing for implementing the above described control will be described referring to FIG. 11. FIG. 11 is a flowchart that illustrates an example of control that is executed by the ECU according to Embodiment 4 of the present invention. The routine shown in FIG. 11 is repeatedly executed during operation of the engine, and the routine illustrates processing in a case where the specific operation condition has been established. In the routine shown in FIG. 11, first, in step 400, the ECU 60 calculates the above described VTmax and VTmin. Thereafter, in step 402, the ECU 60 calculates the maximum value KLmax of the load that corresponds to VTmax, and the minimum value KLmin of the load that corresponds to VTmin.

Next, in step 404, the ECU 60 determines whether or not the maximum value KLmax of the load is less than the target KL. If the result determined in step 404 is affirmative, the processing shifts to step 406 in which the ECU 60 executes the air amount maximization processing described in the foregoing Embodiment 1. On the other hand, if the result determined in step 404 is negative, the processing shifts to step 408. In step 408, the ECU 60 subtracts the load KL at the current time from the target KL to thereby calculate the difference ΔKL therebetween, and determines whether or not the difference ΔKL is greater than the vicinity determination value S. If the result determined in step 408 is affirmative, since it can be considered that the current VT is at a position that is separated from the target VT, the processing shifts to step 406. In step 406, as described in the foregoing Embodiment 2, depending on the magnitude relation between the load KL at the current time and the target KL, the ECU 60 executes either one of the first air amount increasing processing and the first air amount decreasing processing.

On the other hand, if the result determined in step 408 is negative, the circumstances correspond to a case where it is desired to minimize the load KL in a situation in which there are a plurality of local minimum points on the load characteristic line. In this case, first, the processing shifts to step 410 in which the ECU 60 determines whether or not the target KL is less than the minimum value KLmin of the load. If the result determined in step 410 is affirmative, the processing shifts to step 412 in which the ECU 60 executes the above described air amount minimization processing. On the other hand, if the result determined in step 410 is negative, the processing shifts to step 414 in which the ECU 60 determines whether or not the difference ΔKL is greater than a vicinity determination value S'. Although the vicinity determination value S' is set according to the same concept as the above described vicinity determination value S, the vicinity determination value S' may be set to a different value to the vicinity determination value S.

If the result determined in step 414 is affirmative, since it can be considered that the current VT is at a position that is separated from the target VT, the processing shifts to the above described step 412. In step 412, depending on the magnitude relation between the load KL at the current time and the target KL, the ECU 60 executes either one of the above described second air amount increasing processing and second air amount decreasing processing. On the other hand, if the result determined in step 414 is negative, since the current VT is at a position in the vicinity of the target VT, the processing shifts to step 416. In step 416, the ECU 60 searches for an appropriate valve timing in the vicinity of the current VT such that the load KL approaches the target KL.

Figure 11:
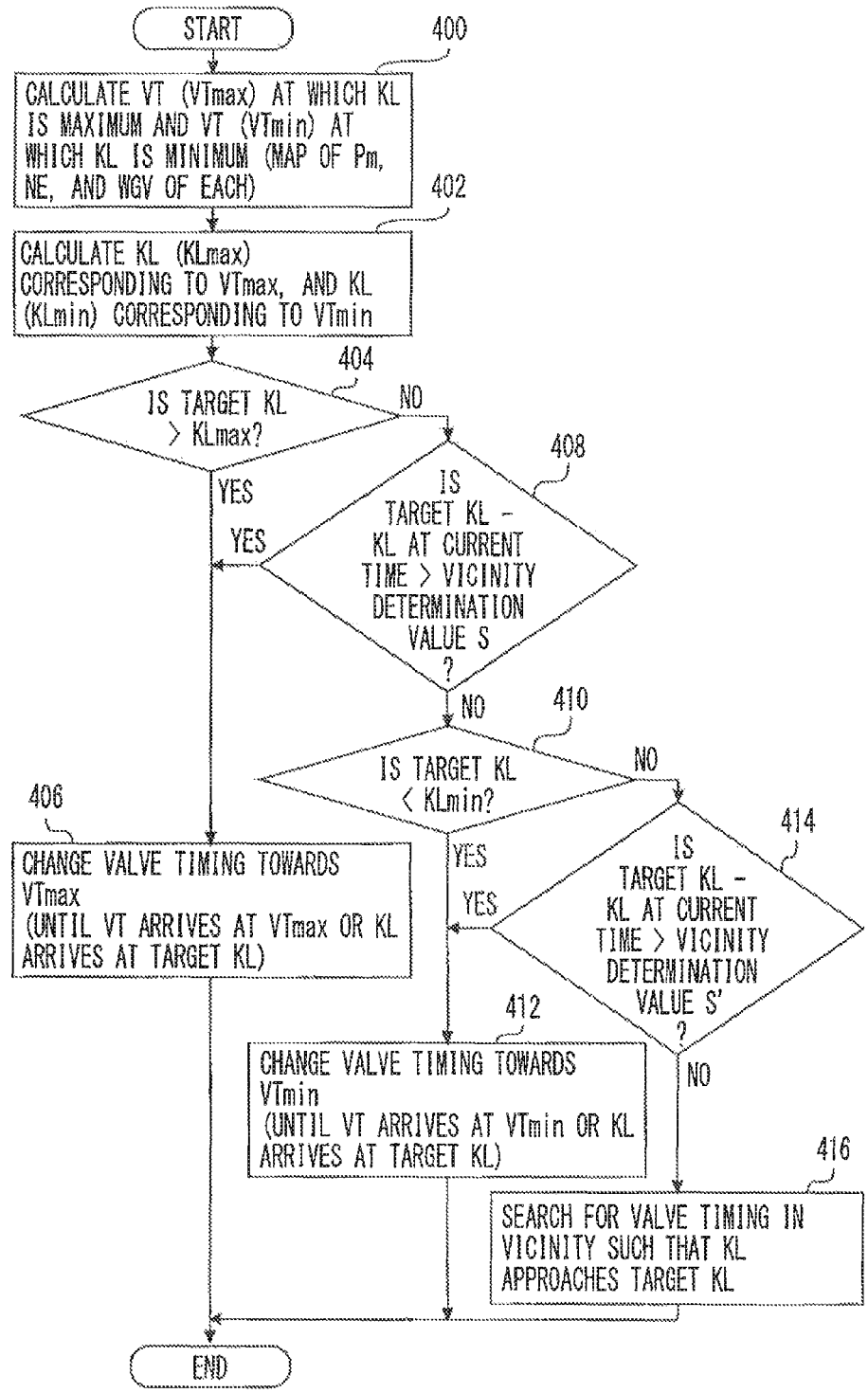
FIG. 11 is a flowchart that illustrates an example of control that is executed by the ECU according to Embodiment 4 of the present invention.

Note that, in the above described Embodiment 4, step 400 in FIG. 11 represents a specific example of maximum air amount VT calculation means and minimum air amount VT calculation means. Further, the processing from step 404 to step 406 represents a specific example of air amount minimizing means.

Although in the foregoing Embodiments 1 to 4, the configurations of the respective embodiments are individually described, the present invention is not limited thereto, and a system may also be realized by combining one or a plurality of configurations that can be combined among Embodiments 1 to 4. In addition, although in the foregoing Embodiments 1 to 4, cases were exemplified in which two local maximum points (or local minimum points) exist on a load characteristic line, the present invention is not limited thereto, and the present invention can also be applied to a case in which there are three or more local maximum points (or local minimum points).

DESCRIPTION OF REFERENCE NUMERALS 10 engine (internal combustion engine), 12 piston, 14 combustion chamber, 16 crankshaft, 18 intake passage, 20 exhaust passage, 22 throttle valve, 24 intercooler, 26 catalyst, 28 fuel injection valve, 30 spark plug, 32 intake valve, 34 exhaust valve, 36 turbosupercharger, 36a turbine, 36b compressor, 38 bypass passage, 40 waste gate valve, 42 intake VVT (valve timing varying means), 44 exhaust VVT, 50 crank angle sensor, 52 air flow sensor, 54 intake air pressure sensor, 60 ECU, KL load (air amount index), VTmax (maximum air amount VT), KLmax (maximum value of air amount index), VTmin (minimum air amount VT), KLmin (minimum value of air amount index)

The invention claimed is:

1. A control device for an internal combustion engine, comprising:
   valve timing varying unit that is capable of changing a valve timing of an intake valve, and
   intake valve control unit for setting a target value of an air amount index in which an air amount in a cylinder is reflected, and also calculating a target valve timing that is a target value of the valve timing of the intake valve based on the target value of the air amount index, and controlling the valve timing of the intake valve so that the valve timing matches the target valve timing by driving the valve timing varying unit;
   wherein the intake valve control unit comprises:
   maximum air amount VT calculation unit for, in a case where a predetermined operation condition that a plurality of local maximum points exist on a characteristic line representing a relation between the valve timing of the intake valve and the air amount index is established, calculating a valve timing corresponding to a maximum value of the air amount index as a maximum air amount VT, and
   air amount maximizing unit for, in a case where the operation condition is established and the maximum value of the air amount index is less than the target value, changing the valve timing of the intake valve towards the maximum air amount VT.

2. The control device for an internal combustion engine according to claim 1, wherein the intake valve control unit comprises air amount increasing unit for, in a case where the maximum value of the air amount index is greater than the target value and the target value is greater than a current air amount index in a state in which the operation condition is established, changing the valve timing of the intake valve towards the maximum air amount VT until reaching a value that corresponds to the target value.

3. The control device for an internal combustion engine according to claim 1, wherein the intake valve control unit comprises air amount decreasing unit for, in a case where the maximum value of the air amount index is greater than the target value and the target value is less than a current air amount index in a state in which the operation condition is established, changing the valve timing of the intake valve in a direction in which the air amount index decreases, until reaching a value that corresponds to the target value.

4. The control device for an internal combustion engine according to claim 1, wherein the intake valve control unit comprises vicinity searching unit for, in a case where the operation condition is established and a difference between a current air amount index and the target value is less than a predetermined vicinity determination value, changing the valve timing of the intake valve in a direction in which the difference decreases.

5. The control device for an internal combustion engine according to claim 1, further comprising:
   minimum air amount VT calculation means unit for, in a case where a predetermined operation condition that a plurality of local minimum points exist on the characteristic line is established, calculating a valve timing corresponding to a minimum value of the air amount index among the respective local minimum points as a minimum air amount VT; and
   air amount minimizing unit for, in a case where the operation condition is established and the minimum value of the air amount index is greater than the target value, changing the valve timing of the intake valve towards the minimum air amount VT.

6. A control device for an internal combustion engine, comprising:
   valve timing varying unit that is capable of changing a valve timing of an intake valve, and
   intake valve control unit for setting a target value of an air amount index in which an air amount in a cylinder is reflected, and also calculating a target valve timing that is a target value of the valve timing of the intake valve based on the target value of the air amount index, and controlling the valve timing of the intake valve so that the valve timing matches the target valve timing by driving the valve timing varying mm mans unit;
   wherein the intake valve control unit comprises:
   minimum air amount VT calculation unit for, in a case where a predetermined operation condition that a plurality of local minimum points exist on a characteristic line representing a relation between the valve timing of the intake valve and the air amount index is established, calculating a valve timing corresponding to a minimum value of the air amount index among the respective local minimum points as a minimum air amount VT; and
   air amount minimizing unit for, in a case where the operation condition is established and the minimum value of the air amount index is greater than the target value, changing the valve timing of the intake valve towards the minimum air amount VT.

7. The control device for an internal combustion engine according to claim 1, further comprising:
   a supercharger that supercharges intake air utilizing an exhaust pressure of the internal combustion engine,
   wherein the control device is configured to determine that the operation condition is established in a case where a transition period that extends from before occurrence of scavenging to after occurrence thereof arrives.

* * * * *